(12) United States Patent
Gulbrandsen

(10) Patent No.: US 9,875,371 B2
(45) Date of Patent: Jan. 23, 2018

(54) SYSTEM AND METHOD RELATED TO DRM

(71) Applicant: SGX AS, Oslo (NO)

(72) Inventor: Magnus Skraastad Gulbrandsen, Oslo (NO)

(73) Assignee: Wire I.P. Limited, Dublin (IE)

( * ) Notice: Subject to any disclaimer, the term of this patent is extended or adjusted under 35 U.S.C. 154(b) by 591 days.

(21) Appl. No.: 14/371,042

(22) PCT Filed: Jan. 9, 2013

(86) PCT No.: PCT/NO2013/050003
§ 371 (c)(1),
(2) Date: Jul. 8, 2014

(87) PCT Pub. No.: WO2013/105863
PCT Pub. Date: Jul. 18, 2013

(65) Prior Publication Data
US 2015/0020217 A1    Jan. 15, 2015

(30) Foreign Application Priority Data
Jan. 10, 2012    (NO) .................................. 20120022

(51) Int. Cl.
*G06F 21/62*    (2013.01)
*G06F 21/10*    (2013.01)

(52) U.S. Cl.
CPC .......... *G06F 21/6218* (2013.01); *G06F 21/10* (2013.01)

(58) Field of Classification Search
CPC .............................. G06F 21/6218; G06F 21/10
See application file for complete search history.

(56) References Cited

U.S. PATENT DOCUMENTS 7,904,964 B1 * 3/2011 Risan ..................... G06F 21/10
                                                                    726/27
8,073,828 B2 * 12/2011 Bowden ................. G06Q 10/10
                                                                    705/53

(Continued)

FOREIGN PATENT DOCUMENTS

WO    2006/127359    11/2006

OTHER PUBLICATIONS

International Search Report dated Apr. 9, 2013 in corresponding International Application No. PCT/NO2013/050003.

(Continued)

*Primary Examiner* — Matthew Smithers
(74) *Attorney, Agent, or Firm* — Wenderoth, Lind & Ponack, L.L.P.

(57) ABSTRACT

A system for controlling access to copyrighted data comprises, at least: a plurality of users having computers, each computer being assigned a unique identity and each computer being configured for communicating with external units via a core network; a core network operated by a telecommunications organization; an access handler configured to communicate with the computers via the core network and a communication interface configured for routing incoming data traffic to a first database; wherein the first database includes at least one table, in which table the unique identities of the computers are associated with access rights for each one of the unique identities, and the first database is configured to communicate with a second database and a third database/server; the second database includes copyrighted data material, and the second database is further configured to communicate via the core network with the computers for transferring requested copyrighted data material.

19 Claims, 1 Drawing Sheet

(56) References Cited

U.S. PATENT DOCUMENTS

| | | | | |
|---|---|---|---|---|
| 8,336,090 B2* | 12/2012 | Ache | ................... | G06F 21/10 |
| | | | | 705/75 |
| 2001/0037379 A1* | 11/2001 | Livnat | ................ | G06F 21/6218 |
| | | | | 709/219 |
| 2005/0004873 A1* | 1/2005 | Pou | ................... | G06F 21/10 |
| | | | | 705/51 |
| 2006/0123484 A1* | 6/2006 | Babic | ................... | G06F 21/10 |
| | | | | 726/26 |
| 2008/0247543 A1* | 10/2008 | Mick | ................... | G06F 21/10 |
| | | | | 380/201 |
| 2009/0007274 A1* | 1/2009 | Martinez | ................ | G06F 21/10 |
| | | | | 726/27 |
| 2009/0119395 A1* | 5/2009 | Kodama | ............ | G06F 17/3056 |
| | | | | 709/223 |
| 2011/0023127 A1* | 1/2011 | O'Donnell | ............. | G06F 21/10 |
| | | | | 726/26 |
| 2013/0212706 A1* | 8/2013 | Pampagnin | ........ | G06Q 30/0601 |
| | | | | 726/28 |
| 2014/0351917 A1* | 11/2014 | Chickering | ............ | H04L 63/02 |
| | | | | 726/11 |

OTHER PUBLICATIONS

Written Opinion of the International Searching Authority dated Apr. 9, 2013 in corresponding International Application No. PCT/NO2013/050003.

Norwegian Search Report dated Jun. 26, 2012 in corresponding Norwegian Application No. 20120022.

* cited by examiner

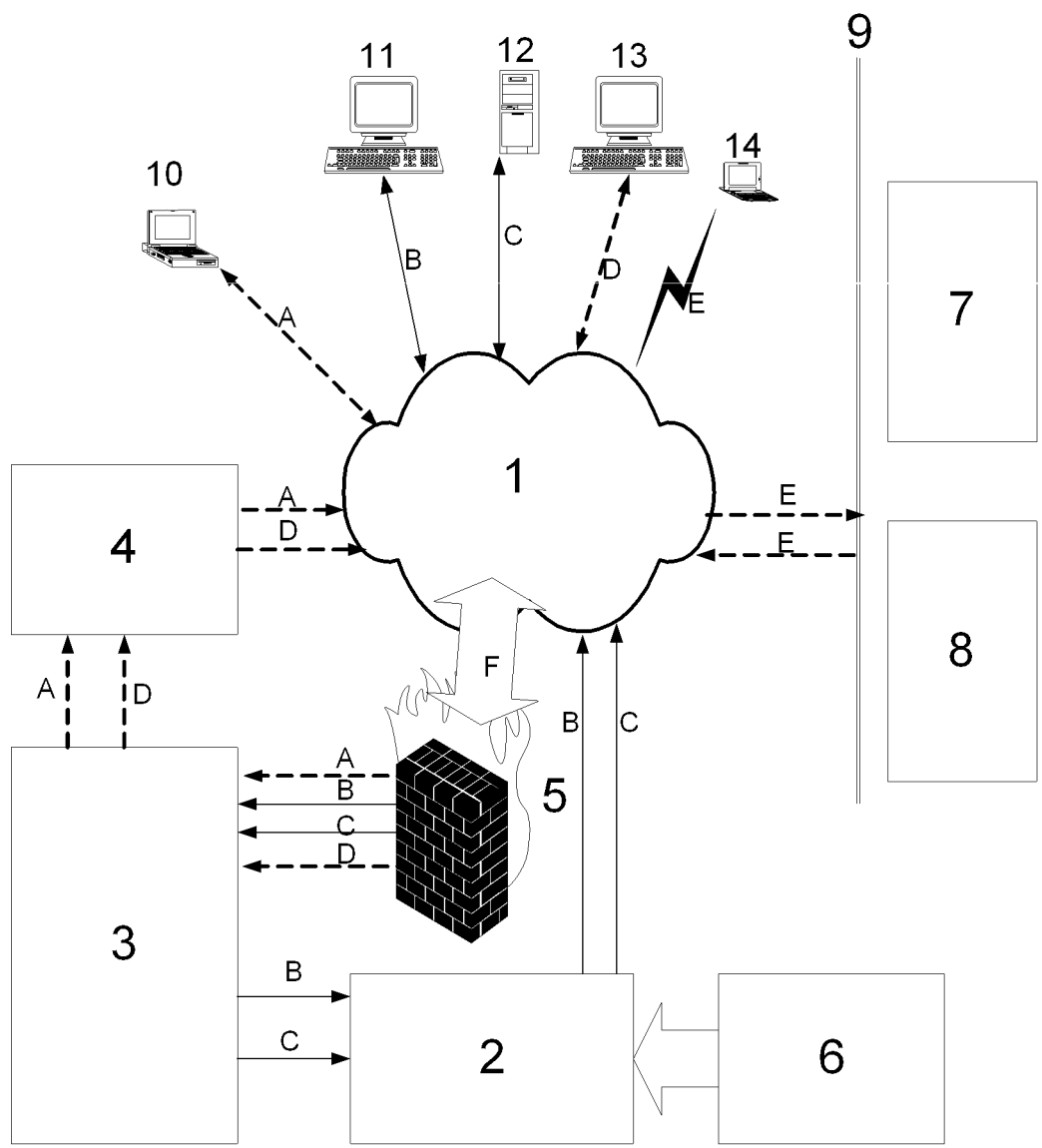

SYSTEM AND METHOD RELATED TO DRM

FIELD OF THE INVENTION

The present invention relates to a system for controlling access to copyright protected data, and a method for the same.

PRIOR ART

The wide access to global computer networks that has become available for individuals has given rise to a multitude of problems related to the access of individuals or groups of individuals to copyright protected material. Such rights-protected material may be music, movies, or other forms of intellectual achievement protected by copyright acts. The problem at hand is how to provide copyright protected material only to the individual(s) having lawfully acquired the right to such material.

Piracy of copyright protected material is a problem that has existed for many years. The problem has increased with the technological development, and in particular the digitalisation of such material combined with the easy access of the public to global networks has contributed to this increase.

Historically, music and movie material, for example, that were distributed for hardware playback were provided with copy protection. Such copy protection, however, on several occasions, has been circumvented in different ways and has hence not worked satisfactorily. Also, in some cases, the copy protection has prevented a legitimate user from utilizing the material.

Network-based access to copyright protected material places completely different demands on protection against unauthorized copying.

The development mentioned above with the digitalization of copyright protected material combined with the wide access to such material via networks has given rise to the term Digital Rights Management (DRM) systems. Such systems usually force a user to comply with conditions accompanying the copyright protected material by imposing technical restrictions on how the material can be used, for example. The restrictions may include copy protection or reduction, printing inhibition or reduced right to print, and limitations on the number of times an individual is allowed to utilize the material.

Despite the effort that has been made to develop adequate DRM systems, the unlawful utilization of copyright protected material is an increasing problem.

It is an object of the present invention to provide a system and method that overcome the above problem of unlawful utilization of copyright protected material.

SUMMARY OF THE INVENTION

The object of the present invention is achieved by a system for controlling access to copyright protected data. The system comprises at least:
a) a plurality of users having computers, each computer being assigned a unique identity and each computer being configured to communicate with external units via a core network;
b) a core network operated by a telecommunications organisation;
c) an access handler provided at least with a communication interface configured to communicate with the computers via the core network, and a communication interface configured for routing incoming data traffic to a first database;
d) the first database including at least one table, in which table the unique identities of the computers are associated with access rights for each one of the unique identities, and the first database being provided with a communication interface configured to communicate with a second database and a third database/server;
e) the second database including copyright protected data material, the second database further being provided with a communication interface configured to communicate via the core network with the computers for transferring copyright protected data material that has been requested;
f) the third database/server being provided with a communication interface configured for sending error messages to the computers (10, 13) that have been rejected by the first database (3).

According to an aspect of the present invention, the unique identity is based on the unique LAN MAC address of a computer.

According to a second aspect of the present invention, the unique identity is based on that the LAN MAC is provided by an IPv6 Autoconfiguration Protocol.

According to another aspect of the present invention, the unique identity is provided by a telecommunications organisation.

According to a further aspect of the present invention, the unique identity is provided as a one-time password. The one-time password may be provided to a user by a telecommunications organisation or service provider holding rights to distribute copyright protected material.

According to a further aspect of the present invention, the second database is further provided with a communication interface configured to receive and store copyright protected data from one or more suppliers of such material.

According to a further aspect of the present invention, the third database/server includes at least one table for indicating error message types.

According to a further aspect of the present invention, the telecommunications organisation operating the core network uses an MPLS protocol for routing traffic from the computers to the access handler.

According to a further aspect of the present invention, the system further comprises means for the telecommunications organisation to prevent access to certain addresses or databases for computers trying to obtain access to those addresses or databases.

According to a further aspect of the present invention, the means (9) are provided as a lookup table stored by the telecommunications organisation, in which table certain URL addresses are indicated as illegal.

According to a further aspect of the present invention, each computer is a device having a unique hardwired address configured for connecting to networks, wirelessly or wired.

According to a further aspect of the present invention, each computer is one of: a PC, a PDA, a smart phone, a smart TV, a notebook PC and a tablet PC.

The present invention also provides a method for controlling access to copyright protected data, at least comprising the steps of:
a) providing a unique identity to one or more computers;
b) providing an access handler having at least a communication interface configured to communicate with the computers via a core network and a communication interface configured for routing incoming data traffic to a first database (3);

c) providing the first database including at least one table, in which table the unique identities of the computers are associated with access rights for each one of the unique identities, the first database being provided with a communication interface configured to communicate with a second database and a third database/server;

d) providing the second database including copyright protected data material, the second database being further provided with a communication interface configured to communicate via the core network with the computers for transferring copyright protected data material being requested;

e) providing the third database/server having a communication interface configured for sending error messages to the computers that have been rejected by the first database.

Further features and advantages of the present invention will be apparent from the accompanying dependent patent claims.

BRIEF DESCRIPTION OF THE DRAWINGS

In the following a brief description of the attached drawings is provided to facilitate the understanding of the invention, and the detailed description that follows makes reference to the drawings, in which:

FIG. 1 shows an exemplary system for controlling access to copyright protected data according to an aspect of the present invention.

DETAILED DESCRIPTION OF THE INVENTION

In the following, general embodiments in accordance with the present invention are first described, and then particular exemplary embodiments are described. Where possible, reference will be made to the attached drawings, using reference numbers of the drawings if applicable. It should be noted, however, that the drawings only show exemplary embodiments, and further details and embodiments may also fall within the scope of the invention, as described.

By the term copyright protected material shall be understood any material protected by copyright acts, also including data protected through legally binding private agreements, such as license agreements and the like. As the invention relates to controlling access to copyright protected material across computer networks, the term copyright protected material does not include any tangible material, but the term encompasses any digital interpretation of tangible material subject to intellectual property rights. Such physical material includes, but is not limited to, photographs, paintings but also sculptures and other three-dimensional objects the digital interpretation of which can be used for the production and utilization of three-dimensional objects, for example.

The term telecommunications organisation, in the context of the invention, shall encompass any network access provider allowed to communicate data traffic to and from a user and also allowed to distribute copyright protected material directly or indirectly to one or more users.

The term rights holder refers to one or more individuals which lawfully possess the right to copyright protected material. In the cases in which a telecommunications organisation offers copyright protected material owned thereby, the telecommunications organisation may also be a rights holder. Such material can be software platforms or computer applications, for example, with the term computer being construed in accordance with the definition given below.

The term rights provider refers to one or more individuals which may lawfully mediate copyright protected material. A telecommunications organisation may be a rights provider.

By the term computer shall be understood any device that is able to connect to a computer network and that can also be identified by a unique identity. The unique identity may be associated with the device as a hardware identity, such as MAC or IMEI identities, for example, or the unique identity may be associated with a user in that it has been assigned to a user by a telecommunications organisation, a rights holder or a rights provider.

The following presents a brief general discussion of important aspects of the present invention.

The problem of unauthorized use of material subject to copyright protection is addressed by the invention by a combination of technical means and administrative restrictions imposed as a consequence of the technical means. Today, a telecommunications organisation normally will see no benefits in preventing unauthorized downloading and improper use of material protected by intellectual property laws, as this presents a challenge that is not profitable for the telecommunications organisation. If the earnings of the telecommunications organisations were made to depend on that material protected by intellectual rights is utilized lawfully, this would be an incentive for a telecommunications organisation to prevent the unauthorized utilization of such rights-protected material through illegal downloading, for example. A telecommunications organisation may then choose to prevent access to databases 7, 8 containing material protected by copyright that is stored without the consent from the rights holders. An example of such a scenario is shown in FIG. 1, where a computer 14 tries to access a database 7, 8, possibly via a URL, and the telecommunications organisation prevents access to the database, shown by a symbolic blocking 9.

As mentioned above, the problem addressed by the present invention is that one or more rights holders 6 wish to prevent the unauthorised utilization of copyright protected material. This is achieved according to the invention in that the rights holders enter into cooperation with one or more telecommunications organisations. The telecommunications organisation(s) may be given access to the copyright protected material for distribution by the rights holders 6. The access may be time-limited and geographically limited or be otherwise limited according to agreements entered between the telecommunications organisation and rights holders 6. Typically, it can be envisioned that the telecommunications organisation includes access to copyright protected material for users of its network, such as through subscription arrangements or by arrangements in which the users pay for a given number of downloads of copyright protected material, for example; hence a limited access. Rights holders 6, on the other hand, according to agreements with the telecommunications organisation, may be entitled to an agreed-on royalty fee in proportion to the utilization of copyright protected material that has taken place, or royalty fees can be agreed based on other premises. It must be understood that the telecommunications organisation may enter into agreements with independent rights holders, and also that the telecommunications organisation should be able to differentiate the access to copyright protected material between users of the telecommunications organisation. As mentioned above, the telecommunications organisation as such may also be a rights holder.

The copyright protected material managed by the telecommunications organisation for distribution is stored in a second database 2. This second database 2 needs to be provided with several communication interfaces.

It is assumed that the copyright protected material can be transferred to the second database 2. The transfer might take place wirelessly, through a wired connection or by way of hardware, such as optically readable media such as compact discs (CD), digital versatile discs (DVD), optical disks or via memory sticks or the like. It is hence assumed that database 2 includes an interface for the transfer of copyright protected material.

According to the invention, the second database 2 also includes a communication interface with a first database 3.

According to the invention, the second database 2 further includes a communication interface with one or more users 10, 11, 12, 13, 14, which interface serves the purpose of providing data transfer from the second database 2 to one or more of said users. Typically, this transfer will occur via a core network 1.

The first database 3, in addition to the communication interface with the second database 2, also includes at least one additional interface. The first database is configured for communication with an access handler 5, which access handler 5 serves as an access point/firewall between computers 10, 11, 12, 13 14 and the first database 3. The first database 3 may also include a communication interface with a third database 4, the third database 4 being an error message central.

The first database 3 includes dynamic lists or tables, which lists or tables comprise a mapping between the users of the telecommunications organisation, or the hardware of the users, and the copyright protected material to which access is to be grantable. The tables are dynamic in the sense that they are extensible with respect to the storable number of users, or identities, in the sense that the mappable amount of copyright protected material can be increased and reduced, and not the least in the sense that the tables may include a number of downloads made by a single user (identity), or that a users right to access certain material is to be stopped because a given time period for downloading/accessing such material has expired or because a user has not paid for a right to download. According to an aspect of the present invention, the dynamic functionality is achieved in that the first database 3 comprises algorithms implemented by a server or a general computer.

It must be understood that the first, second, and third databases may be integrated as one device or be administered by a common server or computer.

The third database is configured to communicate with a plurality of computers 10, 11, 12, 13, 14 via a core network 1.

The third database 4, namely the error message central, is configured to receive information from the first database 3, which information includes information on why individual computers/users 10, 13 are denied access to copyright protected material they have tried to access. Other information relevant for the individual user in relation to a right to access particular rights-protected material that is about to be lost due, for example, to the expiration of a license agreement or the like, may also be communicated between the first and third databases. The information communicated typically will not be directly interpretable for a user/computer 10, 11, 12, 13, 14 as the third database associates information from the first database with textual messages which are understandable for the individual user.

The functionality of the third database may be included in the first database, as will be understood by a person skilled in the art.

Although the individual databases is referred to as separate and shown physically separated in FIG. 1, one or more databases could be integrated within the same housing.

Protocols

In order to prevent unauthorized access to copyright protected material it is essential that interfaces at the endpoints, i.e. computers 10, 11, 12, 13, 14 and second database 2, are configured for secure transfer of data. It is also essential that the authentication of computers 10, 11, 12, 13, 14 accessing the second database 2 is secure.

The use of encryption of data transferred between end nodes ensures that no intermediate nodes will be able to make improper use of transferred data. A variety of protocols/applications exist for encryption purposes. The HTTP protocol, belonging to the application layer, is not secure in itself, but HTTP over SSL or TLS (HTTPS), i.e. Hyper Text Transfer Protocol over Secure Socket Layer/Transport Layer Security, offers encrypted transfer of data. The administrator of the second database 2, i.e. the telecommunications organisation, may compose a digital certificate. The certificate must then be signed by a certificate authority, and only after such signing the certificate owner, i.e. the administrator of the second database 2, will be able to prove its true identity. HTTPS may be used for client reliability checking in order to restrict the access to a Web server, such as the second database 2, for example, to only authorized users. To implement such checking, the administrator of the web site typically creates a certificate for each user. The certificates are loaded into the web browsers of the users. Normally, such certificates contain the name and email address of the users, and are automatically checked by the server each time a new connection is established. This may be used instead of having to enter a password.

According to an aspect of the present invention, the unique identity of users, or, rather, hardware, may be based on that LAN MAC is provided by IPv6 Autoconfiguration Protocol. This requires that IPv6 is implemented, among other things because the MAC address has a length of 48 bits whereas IPv4 has an address space of 32 bits.

A variety of prior art methods exist for the secure authentication of hardware/computers 10, 11, 12, 13, 14 which ensure that the access handling is carried out correctly in the first database 3. Similarly, for security reasons, it is essential that hardware/computers 10, 11, 12, 13, 14 are able to verify the identity of the second database 2 on the transfer of data B, C to computers 10, 11, 12, 13, 14. The person skilled in the art will be aware of several methods for the secure authentication of clients/databases. In order to prevent intermediate nodes from being able to sniff data during their transfer, advantageously data transferred between end nodes will be encrypted. Encryption may be provided using applications/protocols other than the HTTPS protocol discussed above.

A First Embodiment According to the Present Invention

Reference is made to FIG. 1, in which a computer 10 tries to obtain access to the second database 2 by way of a URL provided for database 2, in order to access a specific piece of rights-protected material. In this particular case, the computer 10 with an associated user has been assigned an IPv6 address, so that the unique identity of users/the user of computer 10 is based on that LAN MAC is provided by an IPv6 Autoconfiguration Protocol. First, the user logs into his or her computer 10, and then, by way of a web browser or proprietary application provided from the telecommunications organisation, the user of computer 10 requests specific rights-protected material, a movie in the present example. The inquiry is sent via communication links A to the core network 1 using the HTTPS protocol. In the core network, the request is routed towards an access handler 5. Access handler 5 serves both as a firewall and as a relay to forward the request A to a first database 3. The first database 3 will unpack the header information received in data packets from computer 10, so that the computer 10 can be identified. The first database 3 then will consult a table to see if computer 10 is registered in the table. In this particular case, computer 10 is registered in the table, and the next step is then to check if computer 10 is entitled to access the requested movie. In the first database, all users, i.e. any and all computers or users allowed to access material from the second database 2, are registered, and further tables store which rights are held by the different users/machines. The tables are dynamically updated after use. That is, a machine/user entitled to a given number of accesses or entitled to access a particular material within a given period of time will be subject to an updated profile in the tables of the first database 3. In this particular case no match is found between the movie being requested by the user of computer 10 and a corresponding right granted in the dynamic tables in the first database 3, so the request is rejected. The first database establishes a connection with a third database 4 for transferring error codes generated in the first database 3. In this case, the error codes would indicate that the user/computer 10 is a known user, but that the user is not entitled to access the requested movie. The rejection can be based upon different reasons, in this case that the subscription of the user 10 for movies from a given distributor has expired. After communication between the first database 3 and the third database has been established, the error message code will be unpacked and analyzed/interpreted by the third database. The error message code will be found in a lookup table in the third database, and associated with this error message code will be a text communicating the error type and alternatively what a user can do to fix the error, such as in this case to renew a subscription. The text associated with the error message is addressed to the computer 10 and sent A through the core network 1 back to the computer 10.

A Second Embodiment According to the Present Invention

Reference is made to FIG. 1, in which a computer 11 tries to obtain access to the second database 2 by way of a URL provided for database 2, in order to access a specific piece of rights-protected material. In this particular case computer 11 with an associated user has been assigned an IPv6 address, so that the unique identity for users/the user is given. First, the user logs into his or her computer 11 and then, in this example, by way of a web browser or proprietary application provided from the telecommunications organisation, the user of computer 11 requests access to a particular movie. The inquiry is sent via communication links B to the core network 1 using the HTTPS protocol. In the core network, the request is routed towards an access handler 5. The request B is forwarded to a first database 3. The first database 3 will unpack the header information received in data packets from computer 11, so that computer 11 may be identified. The first database 3 will then consult a table to see if computer 11 is registered in the table. In this case, computer 11 is registered in the table, and the next step is then to check if computer 11 is entitled to access the requested movie. In this particular case a match is found between the movie being requested by the user of computer 11 and a corresponding right granted in the dynamic table(s) in the first database 3, so the request is granted. The first database 3 establishes a connection with a second database 2 in order to access the rights-protected material, i.e., the requested movie. At the same time the access granted to the computer 11 to the particular movie is registered in a table in the first database 3. After communication B between the first database 3 and the second database 2 has been established, the request will be interpreted in the second database 2 and an inquiry to the database will be performed so that access to the requested movie can be given to the computer 11. In this case the second database establishes an encrypted secure connection via core network 1 and computer 11 for transferring the requested movie. In other cases, it can be envisioned that the access is restricted so that reading access is allowed, but downloading to a computer is not, as is known is from a variety of streaming services.

A Third Embodiment According to the Present Invention

Reference is made to FIG. 1, in which a computer 12 tries to obtain access to the second database 2 by way of a URL provided for database 2, in order to access a particular piece of rights-protected material. In this particular case the user of computer 12 has been given a one-time password so that the unique identity for users/the user is given. According to the invention, the one-time password may be generated in various manners, with the objective being to ensure a secure authentication of the user. Any rights held by the user to access rights-protected material will then be exclusive for the user as the authentication is secure. As mentioned, a one-time password can be generated in various manners, with three common algorithms for such generation being: generating one-time passwords using a one-way function (f), generating a time-synchronized one-time password, generating a challenge type one-time password.

One-Way Function Method (f)

This method uses a one-way function (referred to as f). The one-time password system starts by using an initial seed s, and then the mathematical algorithm will generate passwords: f(s), f(f(s)), f(f(f(s))), . . . as many times as necessary. Each password is then handed out in reverse order, with f(f( . . . f(s)) . . . ) first, up to f(s). If an intruder learns one one-time password, then the intruder might be able to gain access to a session covered by this one-time password but the password will be useless once the session is completed. In order to find the next password in the sequence based on the previous one, it would be necessary to find a way to calculate the inverse function $f^{-1}$. As f is a one-way function, this is very difficult to accomplish.

Time-Synchronized One-Time Password

Time-synchronized one-time passwords are normally linked to physical units. Such a unit, referred to as a token, can be provided to each individual user as a generator for one-time passwords. Such tokens are commonly known in the form of password generators handed out by banks. Embedded in this token is a high-precision clock which has been synchronized with the clock of the authentication server. With this type of one-time password system, time is essential as the generation of new passwords is based on hour and not on the previous password or a secret key.

Mobile phones, PDAs, and other types of hand-held units having an embedded clock and a screen display may also be used for generating time-synchronized one-time passwords, hence serving as a token.

Challenge Type One-Time Passwords.

The use of one-time passwords requires a user to correctly authenticate a time-synchronized challenge. This may is accomplished by sending a response to the challenge. In order to avoid duplicates, a counter may be added, so that if a user is given the same challenge two or more times, the result will still give different one-time passwords.

Variants of One-Time Passwords

A common technology for distributing one-time passwords is by sending text messages to a mobile phone by way of Short Message Service (SMS).

Solutions also exist in which a user may obtain a dedicated debit card, which debit card, for example, may contain a certain value that can be used for downloading/accessing rights-protected material. For example, the card may be provided with an access code which is revealed, for example, by scraping off a protective layer.

First, the user logs into his or her computer 12, and then, by way of a web browser or a proprietary application provided by the telecommunications organisation, the user of computer 12 requests, in this example, access to a particular movie. The inquiry is sent via communication links C to the core network 1 in an encrypted form. The remaining downloading process is similar to the one described for the second embodiment.

A Fourth Embodiment According to the Present Invention

Reference is made to FIG. 1, in which a computer 13 tries to obtain access to the second database 2 by way of a URL provided for database 2, in order to access a particular piece of rights-protected material. In this particular case the user of computer 13 has been given a one-time password so that the unique identity for users/the user is given. First, the user logs into his or her computer 13, and then, by way of a web browser or a proprietary application provided from the telecommunications organisation, the user of computer 13 requests a particular piece of rights-protected material, in this example a movie. The inquiry is sent via communication links D to the core network 1 using the HTTPS protocol. The subsequent steps are similar to those described for the first embodiment.

It is worth noting that if a user does not have a valid password or a known identity, a request for downloading from the second database 2 will be returned according to the same pattern as in the first and fourth embodiments. Hence, the second database 2 will not receive any request as the request will/may be returned via the third database 4 for the issuance of an error message to the rejected user(s).

A Fifth Embodiment According to the Present Invention

Reference is made to FIG. 1, in which an eReader 14 tries to obtain access to a fourth database 7,8 by way of a URL provided for that/those database(s), in order to access a particular piece of rights-protected material. The telecommunications organisation/internet service provider of the user of eReader 14 knows that the databases 7, 8 contain rights-protected material stored without the consent of the rights holders. The telecommunications organisation/internet service provider possesses a dynamic list of web sites/URL addresses offering illegal material, so when one of the clients of the telecommunications organisation/internet service provider tries to access such an illegal address, the client will be rejected 9. The telecommunications organisation/internet service provider may reject the client by including an error message informing on the options available for lawfully accessing rights-protected material from the telecommunications organisation/internet service provider.

While specific protocols for transport of data, authentication and so on has been indicated, it must be understood that it is not the particular transport medium, transport means or authentication methods as such that form the subject of the invention. On the application layer, a variety of alternatives to HTTPS exist for the encrypted transfer of data, and, moreover, not only TCP or IP over TCP (TCP/IP) are able to handle the transport, but UDP, SCTP and other protocols could also be used. The application layer, particularly SSH has become popular for transferring data. SSH is not only a network protocol but also a program that can be used for getting access to the command line of a computer.

| | List of definitions |
|---|---|
| 1 | Core network operated by one or more telecom organisations |
| 2 | Database including data of a copyright protected nature, which database further comprises interfaces for communicating with several external units |
| 3 | Database that includes information on access rights of unique identities and is provided with interfaces for communicating with external units. |
| 4 | Database/server that includes error message data, the error messages being associated with requests from unique identities rejected by the database (3). |
| 5 | Access handler provided with communication interfaces for receiving data from the core network (1), as well as a communication interface for communicating with the database (3) |
| 6 | Denotes one or more providers of data material, at least some of which material is copyright protected |
| 7 | Database that includes copyright protected material stored without the consent of the rights holder(s). |
| 8 | Database that includes copyright protected material stored without the consent of the rights holder(s). |
| 9 | Denotes a "symbolic" blocking by an operator allowing the operator to prevent access to certain databases/addresses (7, 8) when access is requested to copyright protected material stored in defiance of the rights holder(s). |
| 10-14 | Exemplary computers, each computer being assigned a permanent unique identity. |
| A-E | Denotes communication paths established by the computers (10-14). |
| LAN | Local Area Network, a local network for network connections between devices configured for connecting to networks, wirelessly or wired. Examples of such devices may be computers, printers, mobile phones, PDAs, etc. |
| LAN MAC | Local Area Network Media Access Protocol; MAC is a unique hardwired address given to any device configured for networking, wirelessly or wired. |
| PDA | Personal Digital Assistant |
| IP | Internet Protocol; the most important protocol on which the Internet is based. |
| IPv4 | Internet Protocol version 4; a fundamental protocol on which the Internet is based. The address field is based on 32 bits. |
| IPv6 | Internet Protocol version 6; a protocol for the Internet. The address field is based on 128 bits, giving, theoretically, $2^{128}$ possible address combinations. The IPv6 standard includes auto-configuration, meaning that an apparatus may assign itself a unique address, the address being based on the LAN MAC address of the device. |
| MPLS | MultiProtocol Label Switching; this is a protocol with which IP networks may carry out forwarding determinations based on labels, so that data packets are forwarded from one network node to the next based on short labels rather that long network addresses so as to avoid complex lookups in routing tables. |
| HTTP | Hyper Text Transfer Protocol; a protocol for transferring hypertext |
| HTTPS | A secure version of HTTP adapted for authentication and encrypted transfer, actually HTTP over SSL or TLS |

-continued

List of definitions

| | |
|---|---|
| FTP | File Transfer Protocol; an operating system independent protocol for transferring files in a TCP/IP-based network. It only operates over TCP. |
| TCP | Transmission Control Protocol; a network protocol for connection-oriented, reliable transfer of information, operating on the transport layer of the OSI computer network model. |
| UDP | User Datagram Protocol; a message-oriented network protocol for connectionless transfer of information, operating on the transport layer of the OSI computer network model. Provides no delivery guarantees, imposes less overhead than TCP, and are suited for transferring real-time data, for example, in which case it is better to discard messages than "delaying" the transfer. |
| SSL | The SSL protocol, Secure Socket Layer |
| TLS | The TLS protocol, Transport Layer Security |
| SSH | Secure shell; a computer program and a network protocol on the application layer, i.e. the upper layer of the OSI model. All traffic between a SSH client and server is encrypted. |
| URL | Uniform Resource Locator |

The invention claimed is:

1. A system for controlling access to copyright protected data, at least comprising:
  a plurality of users having computers, each computer being assigned a unique identity and each computer being configured for communication with external units via a core network,
  a core network operated by a telecommunications organization,
  an access handler provided at least with a communication interface configured to communicate with the computers via the core network and a communication interface configured for routing incoming data traffic to a first database,
  the first database comprising at least one table, in which table the unique identities for the computers are associated with access rights for each one of the unique identities, and the first database being provided with a communication interface configured to communicate with at least a second database, and
  the second database comprising copyright protected data material, the second database being further provided with a communication interface configured to communicate via the core network with the computers for transferring requested copyright protected data material,
  wherein the system further includes means allowing the telecommunications organization to prevent access to particular addresses or databases for computers trying to gain access to the particular addresses or databases.

2. The system of claim 1, wherein the first database is further provided with a communication interface configured to communicate with a third database/server, the third database/server being provided with a communication interface configured to send error messages to the computers that have been rejected by the first database.

3. The system of claim 2, wherein the third database/server comprises at least one table for indicating error message types.

4. The system of claim 2, wherein the unique table in the first database comprises a mapping between the unique identities of the computers and the copyright protected material to which access shall be grantable, wherein the tables are dynamic and extensible with respect to the storable number of unique identities, the mappable quantity of copyright protected material can be increased and reduced, and the tables may include a number of downloads made from a single, unique identity.

5. The system of claim 4, wherein a right held by a unique identity to access particular material can be stopped because a given time period for downloading/accessing such material has expired or because the unique identity has not met access conditions imposed by the telecommunications organization.

6. The system of claim 2, wherein the unique identity is based on the unique LAN MAC address of the computer.

7. The system of claim 1, wherein the unique table in the first database comprises a mapping between the unique identities of the computers and the copyright protected material to which access shall be grantable, wherein the tables are dynamic and extensible with respect to the storable number of unique identities, the mappable quantity of copyright protected material can be increased and reduced, and the tables may include a number of downloads made from a single, unique identity.

8. The system of claim 7, wherein a right held by a unique identity to access particular material can be stopped because a given time period for downloading/accessing such material has expired or because the unique identity has not met access conditions imposed by the telecommunications organization.

9. The system of claim 1, wherein the unique identity is based on the unique LAN MAC address of the computer.

10. The system of claim 9, wherein the unique identity based on LAN MAC is provided by an IPv6 Autoconfiguration Protocol.

11. The system of claim 1, wherein the unique identity is provided by a telecommunications organization.

12. The system of claim 1, wherein the unique identity is provided as a one-time password.

13. The system of claim 1, wherein the second database is further provided with a communication interface configured for receiving and storing rights-protected data from one or more providers of such material.

14. The system of claim 1, wherein the telecommunications organization operating the core network uses an MPLS protocol for routing traffic from the computers to the access handler.

15. The system of claim 1, wherein said means is provided in the form of a lookup table stored by the telecommunications organization, in which table certain URL addresses are indicated as illegal.

16. The system of claim 1, wherein each computer is a device having a unique hardwired address configured for connecting to networks, wirelessly or wired.

17. The system of claim 1, wherein each computer is one of: a PC, a PDA, a smart phone, a smart TV, a notebook PC, or a tablet PC.

18. A method for controlling access to copyright protected data, at least comprising the steps of:
  providing a unique identity to one or more computers,
  providing an access handler having at least a communication interface configured to communicate with the computers via a core network and a communication interface configured for routing incoming data traffic to a first database, the core network being operated by a telecommunications organization,
  providing the first database, comprising at least one table, in which table the unique identities of the computers are associated with access rights for each one of the unique identities, the first database being further provided with a communication interface configured to communicate with a second database, and providing the second database, comprising copyright protected data material, the second database being further provided with a communication interface configured to communicate via the core network with the computers for transferring requested copyright protected data material, wherein the method further includes allowing the telecommunications organization to prevent access to particular addresses or databases for computers trying to gain access to the particular addresses or databases.

19. The method of claim 18, wherein, for the first database, providing a communication interface configured to communicate with a third database/server, and providing a communication interface with the third database/server configured for sending error messages to the computers which is rejected by the first database.

* * * * *